United States Patent
Sychta et al.

(10) Patent No.: US 10,057,545 B2
(45) Date of Patent: Aug. 21, 2018

(54) REDUNDANT VIDEO PATH FOR VEHICLE REAR VIEW CAMERA SYSTEM

(71) Applicant: GM Global Technology Operations LLC, Detroit, MI (US)

(72) Inventors: Brian V. Sychta, Lake Orion, MI (US); Gregg R. Kittinger, Oakland Township, MI (US); Reno V. Ramsey, Sterling Heights, MI (US); Manish Khadtare, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 15/159,019

(22) Filed: May 19, 2016

(65) Prior Publication Data
US 2017/0339375 A1    Nov. 23, 2017

(51) Int. Cl.
*H04N 7/18*     (2006.01)
*G06K 9/00*     (2006.01)

(52) U.S. Cl.
CPC .......... *H04N 7/18* (2013.01); *G06K 9/00791* (2013.01)

(58) Field of Classification Search
CPC ....................... G06K 9/00791; H04N 7/18
See application file for complete search history.

(56) References Cited

U.S. PATENT DOCUMENTS

2012/0327235 A1    12/2012    Wada et al.
2016/0011576 A1 *   1/2016    Takeda ................. B62D 15/029
                                                              700/20

* cited by examiner

*Primary Examiner* — Huy T Nguyen

(57) ABSTRACT

A rear view video system for a vehicle includes a display and a rear view camera that generates a raw video signal. A video modification module receives the raw video signal and generates a modified video signal based thereon. A video analysis module analyzes whether the modified video signal is valid or invalid. A switch outputs the modified video signal to the display when the vehicle is in reverse and the modified video signal is valid and outputs the raw video signal to the display when the vehicle is in reverse and the modified video signal is invalid.

20 Claims, 7 Drawing Sheets

REDUNDANT VIDEO PATH FOR VEHICLE REAR VIEW CAMERA SYSTEM

FIELD

The present disclosure relates to rear view camera systems for vehicles, and more particularly to systems and methods for providing a redundant video path for vehicle rear view camera systems.

INTRODUCTION

The introduction provided here is for the purpose of generally presenting the context of the disclosure. Work of the presently named inventors, to the extent it is described in this introduction section, as well as aspects of the description are neither expressly nor impliedly admitted as prior art against the present disclosure.

Vehicles may include a rear view camera that is attached to a rear portion of a vehicle and that is directed in a rearward direction. The rear view camera provides a view to assist a driver when the vehicle is travelling in reverse. The rear view camera also helps to reduce rear blind spots. Rear view cameras may be viewed on an integrated center stack (ICS) or display or integrated with a rear view mirror. The rear view camera view may be enabled when the driver selects reverse using a transmission gear selector such as a PRNDL lever or manual stick shift.

The image output by the rear view camera is horizontally flipped so that the output is a mirror image. The mirrored image makes the orientation of the display consistent with physical mirrors installed on the vehicle. The rear view camera may include a wide-angle or fisheye lens. While the lens prevents the ability to see faraway objects clearly, it allows the rear view camera to display an uninterrupted horizontal view from one rear corner of the vehicle to the other. The rear view camera may be pointed at a downward angle rather than straight back to allow the driver to view obstacles on the ground.

Some rear view camera systems perform video processing to integrate images from side view cameras with the image from the rear view camera. Video processing may also be performed to reduce distortion caused by the wide-angle or fisheye lens and/or to overlay information such as steering guide lines onto the image. In some situations, the rear view camera system may operate incorrectly and output invalid video images such as an all-black screen, an all-white screen or frozen video images or may have latency greater than 2 seconds after selecting reverse gear state.

SUMMARY

A rear view video system for a vehicle includes a display and a rear view camera that generates a raw video signal. A video modification module receives the raw video signal and generates a modified video signal based thereon. A video analysis module analyzes whether the modified video signal is valid or invalid. A switch outputs the modified video signal to the display when the vehicle is in reverse and the modified video signal is valid and outputs the raw video signal to the display when the vehicle is in reverse and the modified video signal is invalid.

In other features, a buffer is arranged between the rear view camera and the video modification module. The video modification module serializes the modified video signal. A deserializer is arranged between the video modification module and the switch.

In other features, the video analysis module determines that the modified video signal is invalid when the modified video signal includes a frozen image. The video analysis module calculates a phase difference for images in the modified video signal to determine whether or not the modified video signal includes the frozen image.

In other features, the video analysis module determines that the modified video signal is invalid when the modified video signal includes an all-white image or an all-black image. The video analysis module determines whether or not the modified video signal includes the all-white image or the all-black image based upon luma values.

In other features, a serializer is arranged between the switch and the display. The video modification module adds overlay information to the raw video signal when generating the modified video signal.

In other features, the video modification module combines the raw video signal with images from side and front view cameras when generating the modified video signal. The video analysis module determines that the modified video signal is invalid when the video modification module does not generate the modified video signal within a predetermined period after a reverse event occurs.

A rear view video system for a vehicle a display and a rearview camera generates a raw video signal. A video modification module receives the raw video signal and generates a modified video signal based thereon. A video analysis module analyzes whether the modified video signal is valid or invalid and outputs the modified video signal to the display when the vehicle is in reverse and the modified video signal is valid and outputs the raw video signal to the display when the vehicle is in reverse and the modified video signal is invalid.

In other features, the video analysis module determines that the modified video signal is invalid when the modified video signal includes a frozen image. The video analysis module calculates a phase difference for images in the modified video signal to determine whether or not the modified video signal includes the frozen image.

In other features, the video analysis module determines that the modified video signal is invalid when the modified video signal includes an all-white image or an all-black image. The video analysis module determines whether or not the modified video signal includes the all-white image or the all-black image based upon luma values.

In other features, a serializer is arranged between the video analysis module and the display. The video modification module adds overlay information to the raw video signal when generating the modified video signal.

In other features, the video modification module combines the raw video signal with images from side and front view cameras when generating the modified video signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
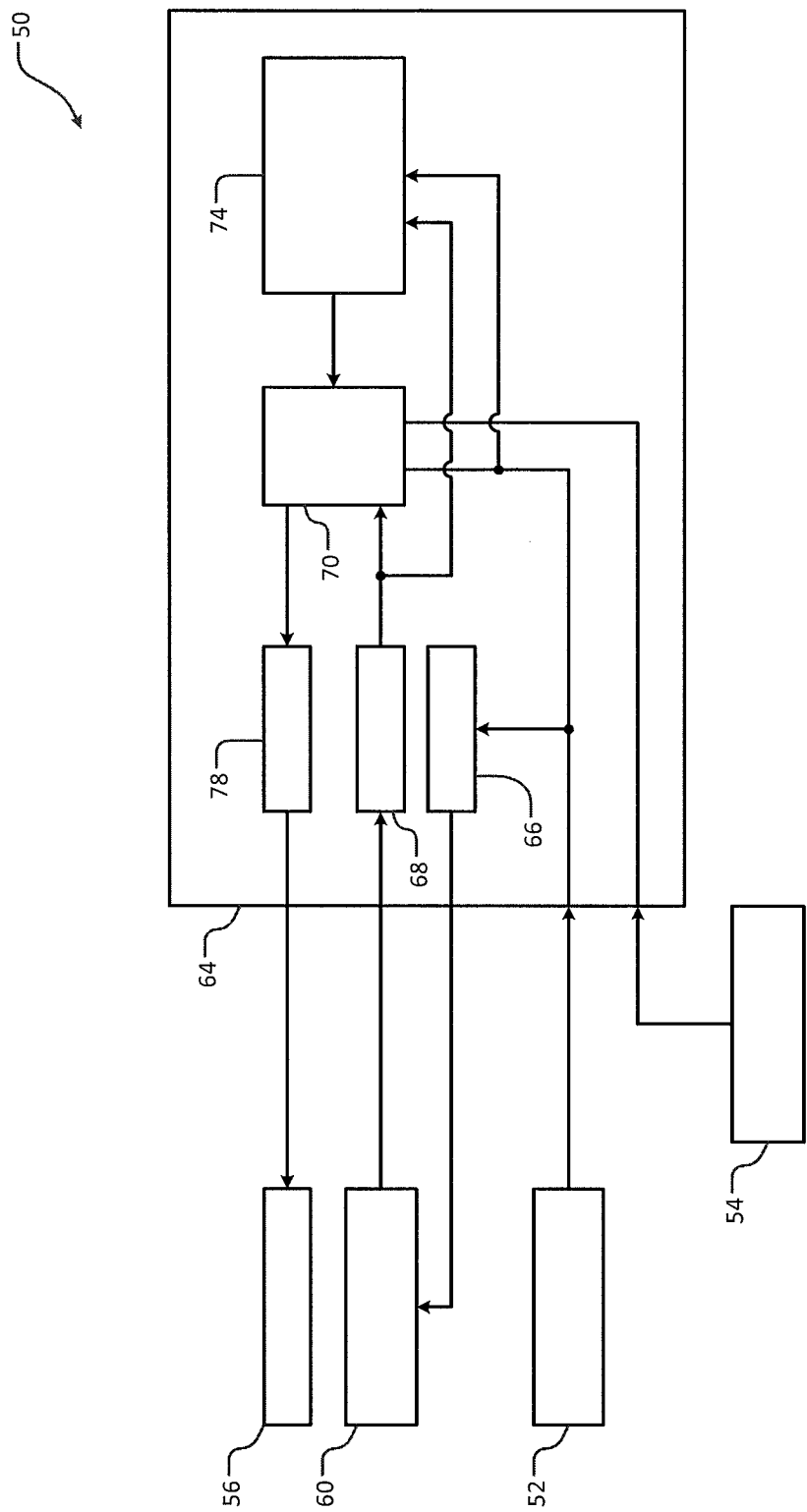
FIG. 1 is a functional block diagram of an example of a rear view camera system with a redundant video path according to the present disclosure.
Figure 2:
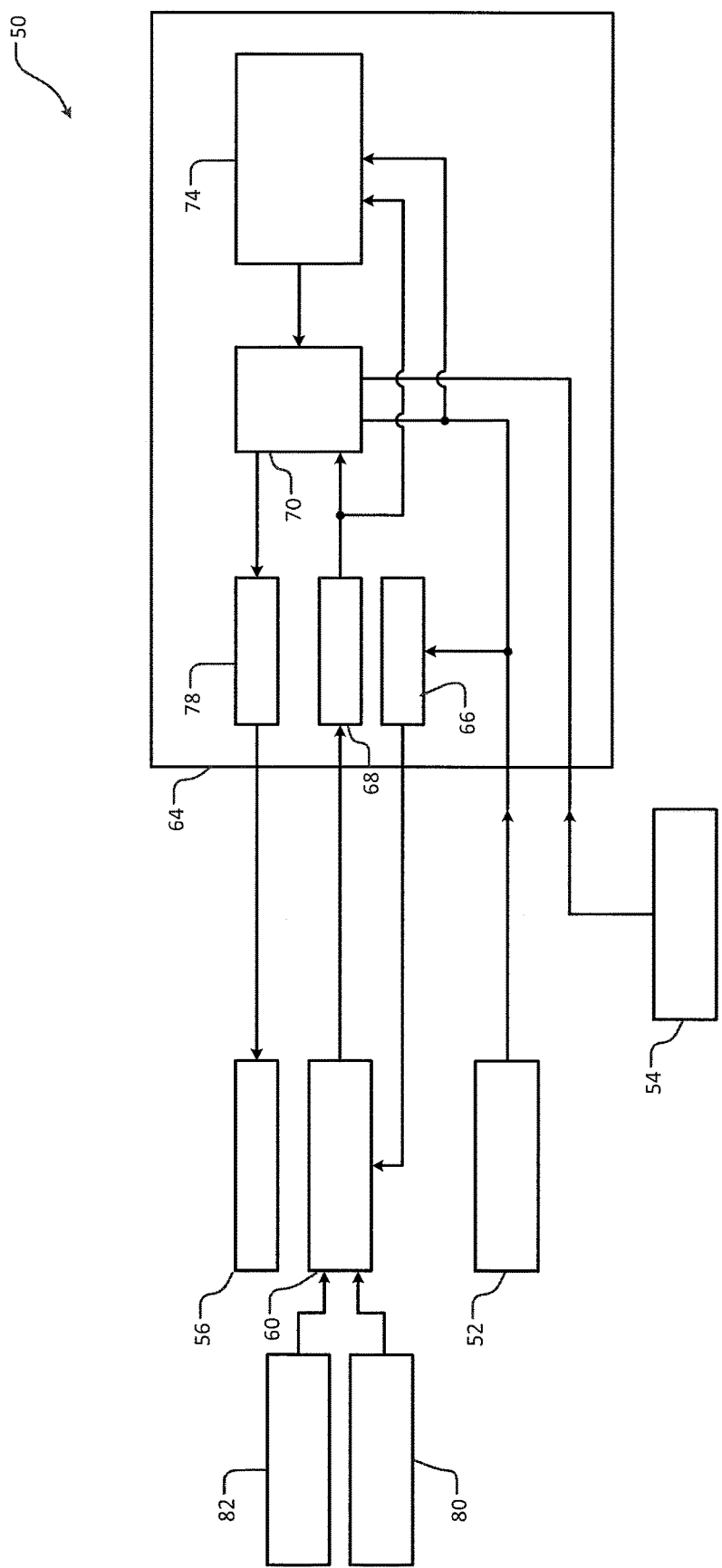
FIG. 2 is a functional block diagram of another example of a rear view camera system with a redundant video path according to the present disclosure.

Referring now to FIGS. 1 and 2, a vehicle includes a rear view camera system 50 including a rear view camera 52. In FIG. 1, a reverse indicator 54 may be provided via a vehicle interface or bus. The vehicle further includes a display 56. In some examples, the display 56 may be part of an integrated center stack (ICS), a display integrated with a rear view mirror, or a display associated with another vehicle system. A video modification module 60 may be provided to modify the video signal. In some examples, the modification includes reducing the effect of the wide-angle lens or combining the video from the rear view camera 52 with reverse steering guidelines and/or other information.

The vehicle further includes a video analyzer and switch 64. The video analyzer and switch 64 includes a buffer 66 for buffering video output by the rear view camera 52 before being input to the video modification module 60. The video analyzer and switch 64 further includes a deserializer 68 for receiving digital video signals from the video modification module 60. In some examples, the digital video signals include low-voltage differential signaling (LVDS) signals. In some examples, an output of the deserializer 68 includes a digital red green blue (DRGB) video signal that is input to a switch 70 and to a video analysis module 74. In some examples, the video analysis module 74 may also receive the video signal output by the rear view camera 52.

The video analysis module 74 analyzes, in some examples, the DRGB video signal output by the deserializer 68 to determine whether the video includes valid or invalid video signals. For example only, the video analysis module 74 may determine whether the DRGB video signal includes frozen video images, all-white video images, and/or all-black video images, although other tests may be performed to identify other types of invalid video signals. When the video analysis module 74 identifies invalid video signals in the DRGB video signal from the video modification module 60, the video analysis module 74 changes a state of the switch 70. The switch 70 selectively switches from the DRGB video signal from the video modification module 60 to the raw video output by the rear view camera 52.

In some examples, an output of the switch 70 is input to a serializer 78, which serializes the DRGB video signal. In some examples, the output of the serializer 78 is a low voltage differential signal (LVDS) video signal. The display 56 receives the serialized digital video signal, deserializes the digital video signal and displays the video signal.

In some examples, the rear view camera system 50 in FIG. 2 may be connected to side view camera(s) 80 that generate first and second side view images that may correspond to driver and passenger side views of the vehicle. In some examples, the rear view camera system 50 may also receive video images from front view camera(s) 82. In addition to other modifications described above, the video modification module 60 may also integrate the first and second side view images from the side and front view cameras 80 and 82 with the rear view images from the rear view camera 52.

In another exemplary embodiment, output from the side view camera(s) 80 and the front view camera(s) 82 may replace or be added to output from the rear view camera 52. In this configuration, a raw video signal output from the side view camera(s) 80 and/or the front view camera(s) 82 may be output onto the display or other device by activation of the switch 70 to bypass the video modification module 60 when the video analysis module 74 identifies invalid video signals in the DRGB video signal from the video modification module 60.

Figure 3A:
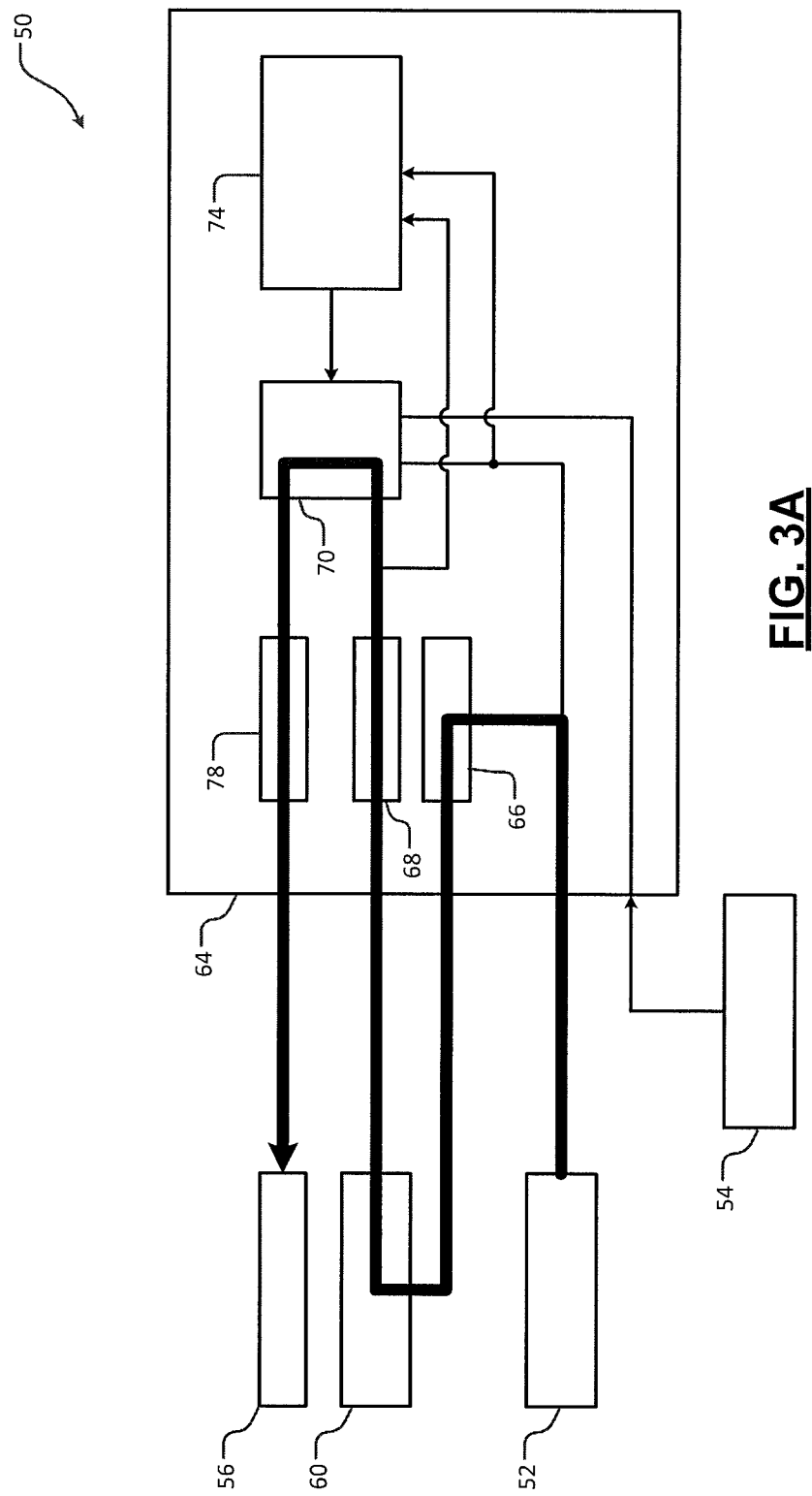
FIGS. 3A and 3B illustrate an example of normal and bypass operation of the rear view camera system of FIG. 1 according to the present disclosure.
Figure 3B:
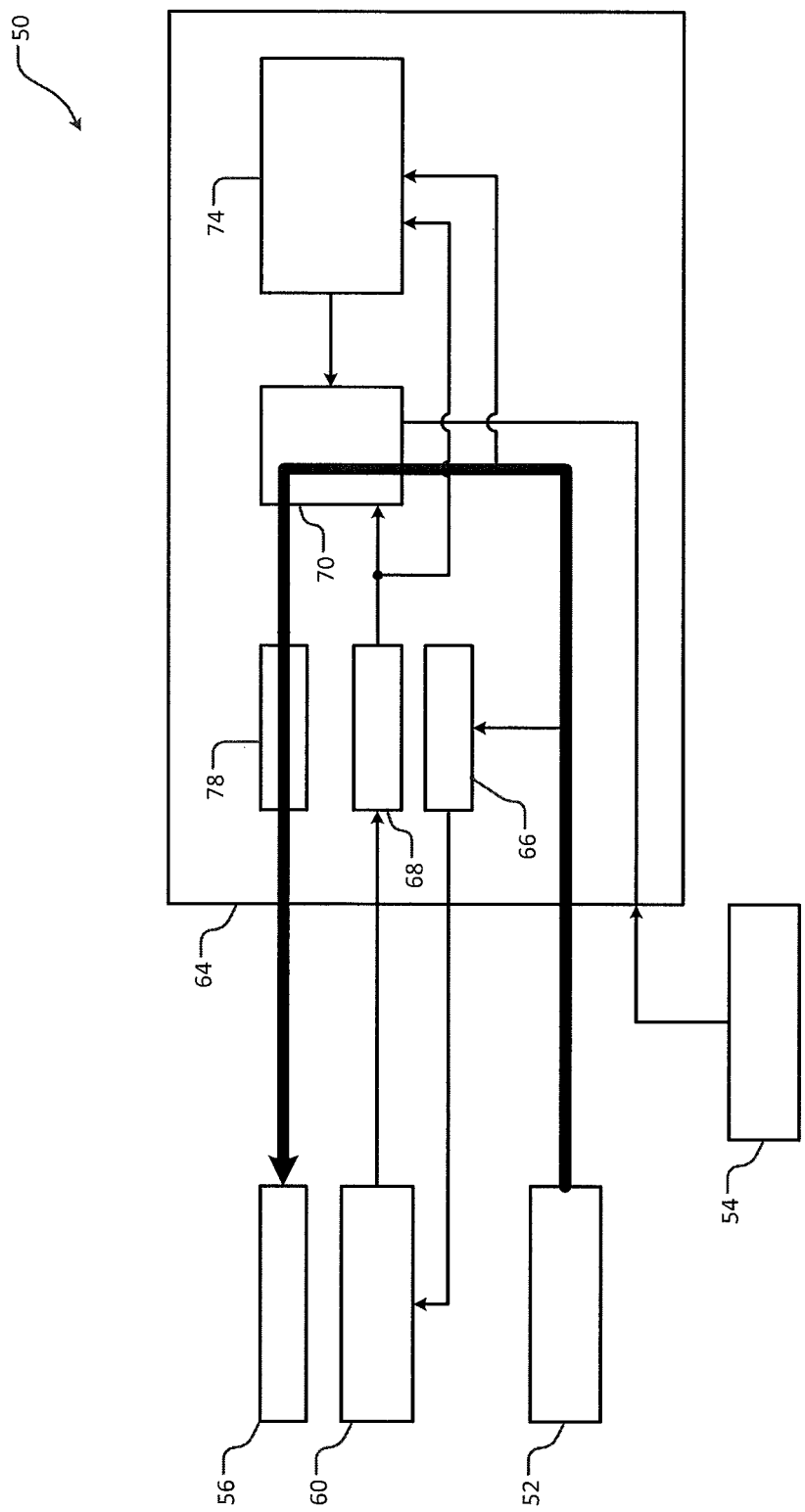

Referring now to FIGS. 3A and 3B, operation in normal and bypass modes is shown. In FIG. 3A, the rear view camera system 50 is shown in the normal mode. The rear view images output by the rear view camera 52 are input to the buffer 66, which outputs the rear view images to the video modification module 60. The video modification module 60 modifies the video and outputs a serialized digital video signal to the deserializer 68. The deserializer 68 outputs, in some examples, the DRGB video signal to the switch 70, which is in a normal mode. The switch 70 outputs the DRGB video signal (corresponding to the modified video signal output by the video modification module 60) to the serializer 78, which outputs a serialized digital video signal to the display 56.

In FIG. 3B, the rear view camera system 50 is shown with the switch 70 in a bypass mode. The rear view video images output by the rear view camera 52 are connected by the switch 70 directly to the serializer 78. The switch 70 outputs, in some examples, the DRGB video signal to the serializer 78, which outputs the serialized digital video signal (corresponding to the raw video signal output of the rear view camera 52) to the display 56.

Figure 5A:
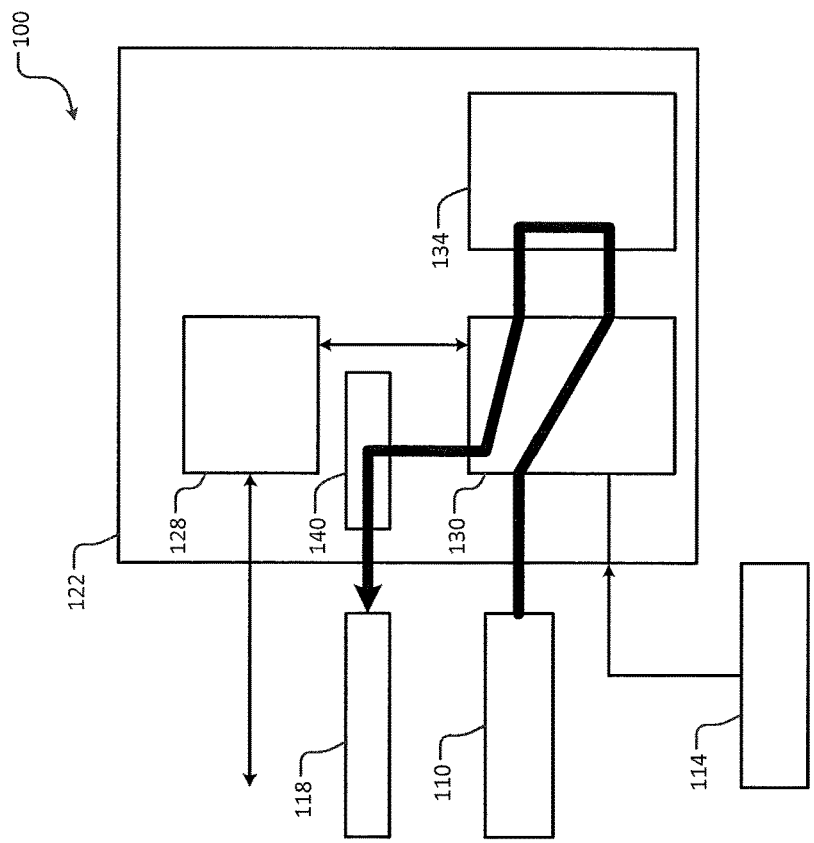
FIGS. 5A and 5B illustrate an example of normal and bypass operation of the rear view camera system of FIG. 4 according to the present disclosure.
Figure 4:
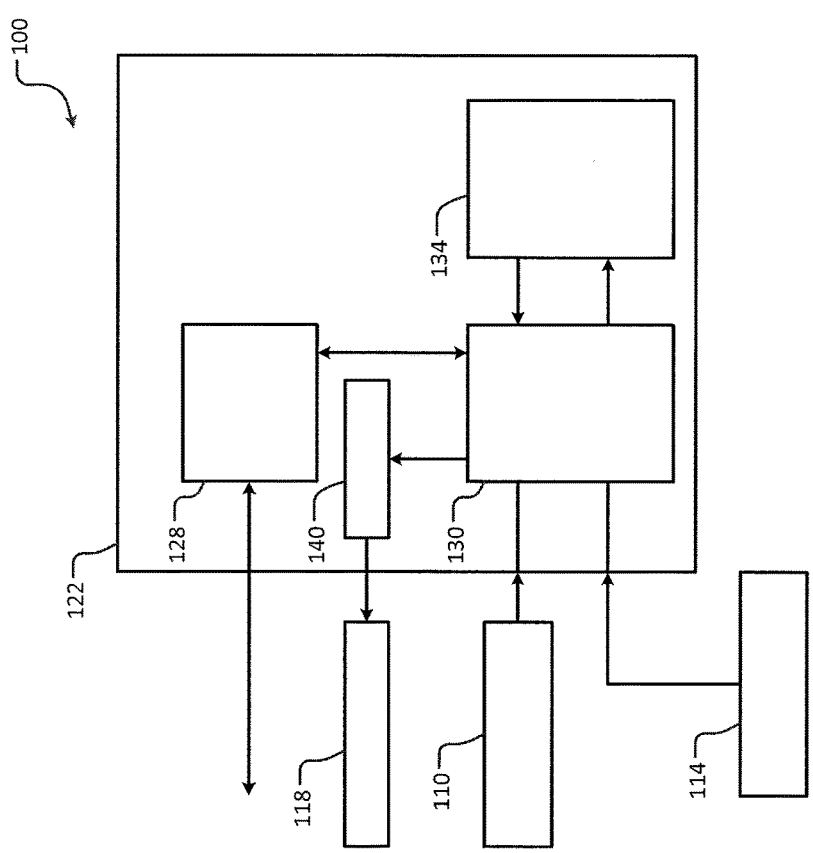
FIG. 4 is a functional block diagram of another example of a rear view camera system with a redundant video path according to the present disclosure.
Figure 5B:
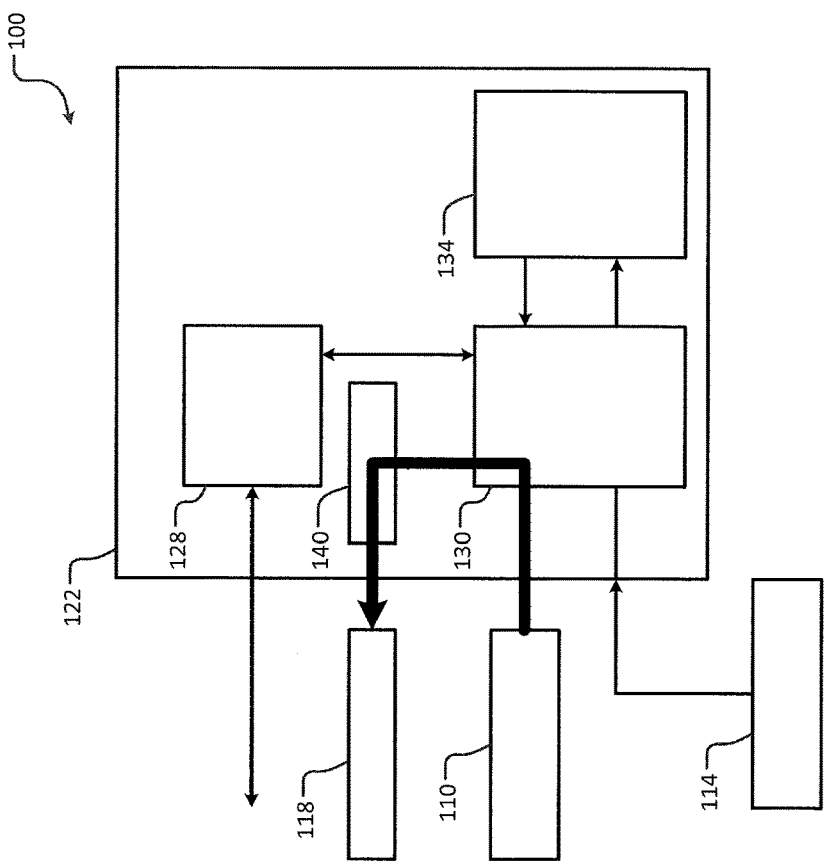

Referring now to FIGS. 4, 5A and 5B, a rear view camera system 100 including a rear view camera 110 is shown. In FIG. 4, a reverse indicator 114 generates a reverse indicating signal. The vehicle further includes a display 118, which may include a display associated with the ICS, a display integrated with a rear view mirror, or other display. A video processor 122 includes a vehicle interface module 128, a video analysis module 130, a video modification module 134, and a serializer 140. The vehicle interface module 128 provides an interface between the video processor 122 and the vehicle.

In the normal mode, the video analysis module 130 forwards the raw video signal from the rear view camera to the video modification module 134. The video modification module 134 modifies the video as described above. The video analysis module 130 analyzes the modified video to determine whether or not the video images are valid as described above.

If the video analysis module 130 determines that the video images are valid, the modified video is forwarded to the serializer 140, which serializes the video signal and outputs the serialized video signal to the display 118. If the video analysis module 130 determines that the video images are invalid, the raw video images are forwarded by the video analysis module 130 directly to the serializer 140, which serializes the raw video signal and outputs the serialized video signal to the display 118. In FIGS. 5A and 5B, operation in normal and bypass modes are shown, respectively.

Figure 6:
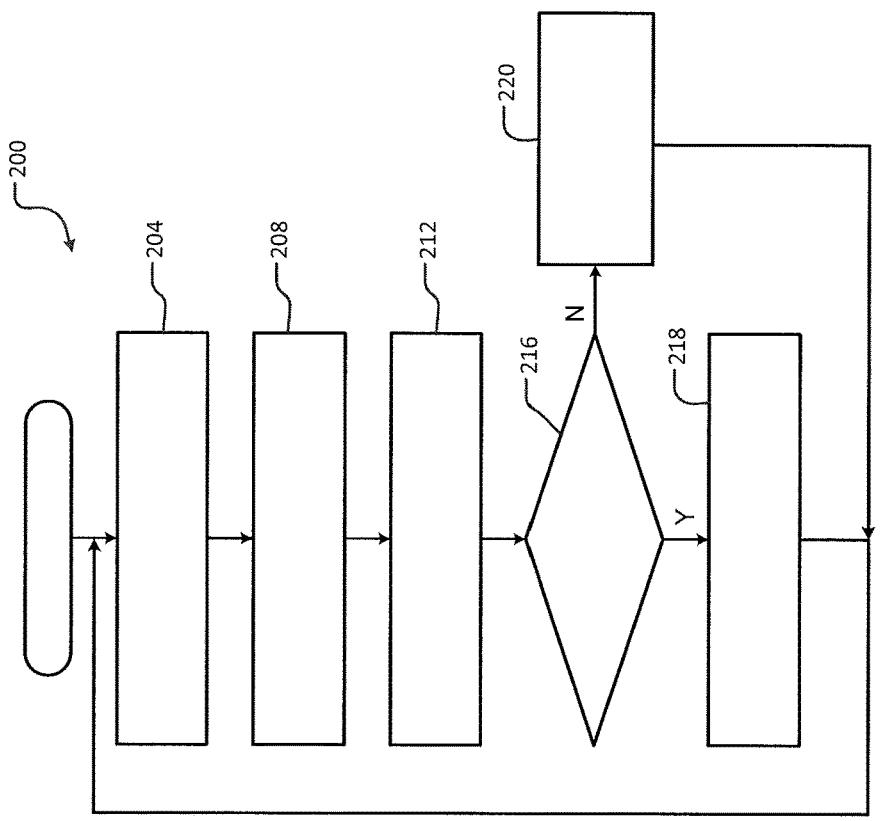
FIG. 6 is a flowchart illustrating an example method for operating the rear view camera system.

Referring now to FIG. 6, a method 200 for operating the rear view camera system is shown. At 204, raw video signals from the rear view camera are received. At 208, video processing is performed to modify the video signals as described above. At 212, the modified video signals are analyzed. At 216, the method determines whether the modified video signals are valid. If 216 is true, the modified video signals are transmitted to the display at 218. If 216 is false, the raw video signals are transmitted to the display at 220.

Figure 7:
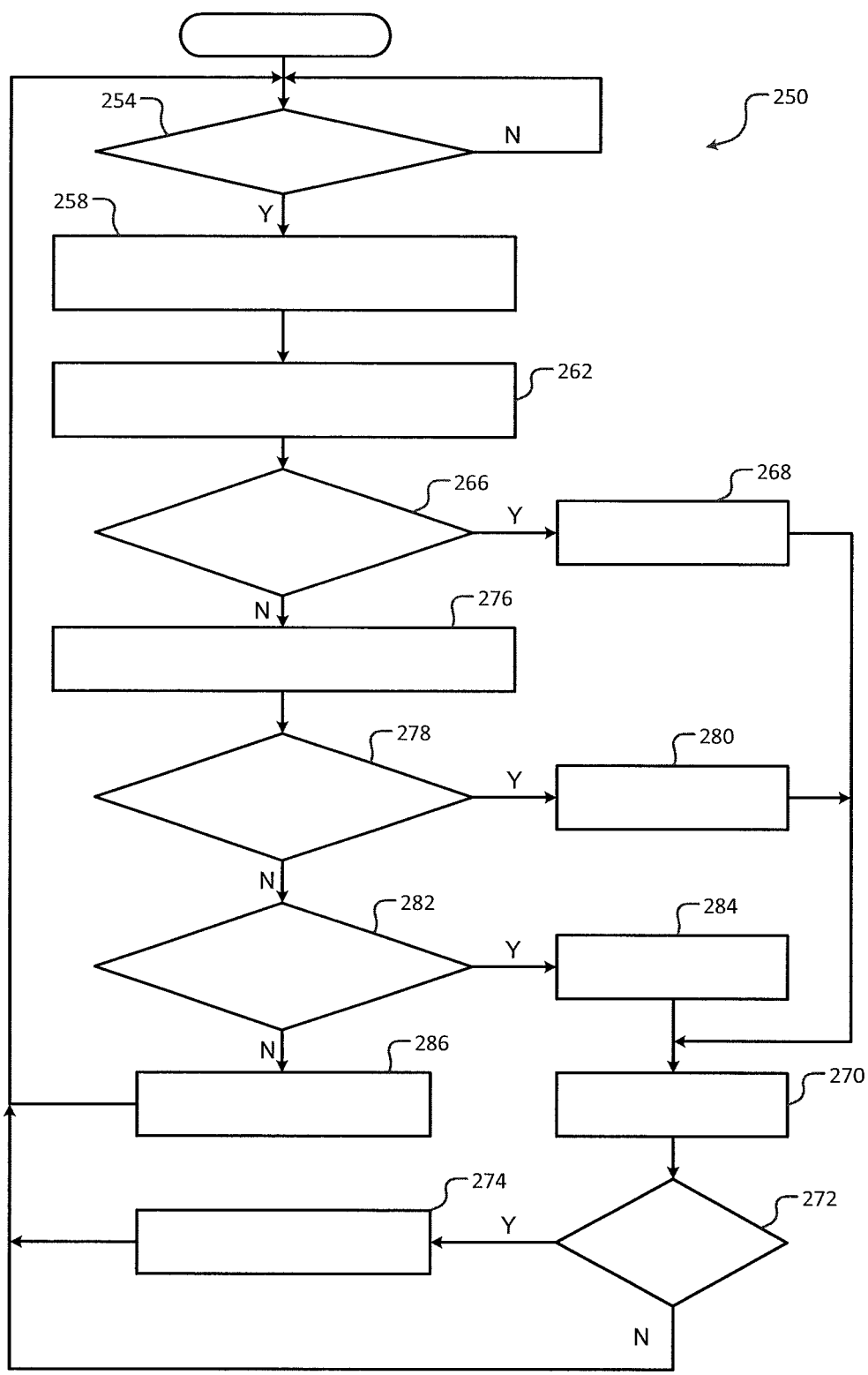
FIG. 7 is a flowchart illustrating an example method for determining when the rear view camera system is not operating correctly.

Referring now to FIG. 7, a method 250 for determining whether or not the rear view camera system is operating correctly is shown. At 254, the method determines whether the driver selects reverse. When 254 is true, the modified video signals are output to the display at 258. At 262, the video analysis module determines a phase difference of successive frames of the modified video signals. For example in a multi-pixel image, the phase difference corresponds to the sum of the differences in color (red, green and blue (RGB)) between each of the pixels.

At 266, the method determines whether the phase differences are less than or equal to a predetermined threshold. If the video image is frozen, then the phase difference will be close to zero. If 266 is true, a frozen image fault occurs at 268 and a counter is incremented at 270. At 272, the method determines whether the counter is greater than or equal to a predetermined threshold. In some examples, the predetermined threshold may be equal to 6. If 272 is false, the method returns to 254. If 272 is true, the method continues with 274 and sends the raw video signals to the display.

If 266 is false, the method continues with 276 and determines luminance or luma measurements for a frame. The YUV model defines a color space of pixels of a frame in terms of one luma (Y) and two chrominance (UV) components (also referred to as $C_r$ and $C_b$). The luminance value described herein corresponds to the average of Y components for all pixels of a current frame. In some examples, the luma measurement results are provided for every other image frame. In this example, the luma measurements are performed in one frame and read, analyzed and reported in the next image frame.

At 278, the method determines whether the luma measurement is less than or equal to a luma threshold corresponding to a dark image. If 278 is true, the method continues with 280 and sets a dark image fault. The method continues from 280 with 270. If 278 is false, the method determines whether the luma measurement is greater than or equal to a luma threshold corresponding to a white image. If 282 is true, the method continues with 284 and sets a white image fault. The method continues from 284 with 270. If 282 is false, the counter is reset at 286 and the method continues with 254.

While specific examples including phase difference and luma measurements are described herein, other criteria can be used to determine whether or not the images from the rear view camera are valid or invalid. For example, in addition to checking for all-black or all-white images, the video analysis module can check for other solid colors such as all blue or all red frames.

In some examples, a time-based check may be performed. If the video modification module has not produced a modified video signal within a predetermined period after a reverse event, the raw video signal is output to the display. In some examples, the predetermined period is approximately 1800 ms, although other periods may be used.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A rear view video system for a vehicle, comprising:
   a display;
   a rear view camera that generates a raw video signal;
   a video modification module that receives the raw video signal and that generates a modified video signal based thereon;
   a video analysis module that analyzes whether the modified video signal is valid or invalid; and
   a switch that outputs the modified video signal to the display when the vehicle is in reverse and the modified video signal is valid and that outputs the raw video signal to the display when the vehicle is in reverse and the modified video signal is invalid.

2. The rear view video system of claim 1, further comprising a buffer arranged between the rear view camera and the video modification module.

3. The rear view video system of claim 1, wherein the video modification module serializes the modified video signal.

4. The rear view video system of claim 3, further comprising a deserializer arranged between the video modification module and the switch.

5. The rear view video system of claim 1, wherein the video analysis module determines that the modified video signal is invalid when the modified video signal includes a frozen image.

6. The rear view video system of claim 5, wherein the video analysis module calculates a phase difference for images in the modified video signal to determine whether or not the modified video signal includes the frozen image.

7. The rear view video system of claim 1, wherein the video analysis module determines that the modified video signal is invalid when the modified video signal includes an all-white image or an all-black image.

8. The rear view video system of claim 7, wherein the video analysis module determines whether or not the modified video signal includes the all-white image or the all-black image based upon luma values.

9. The rear view video system of claim 1, further comprising a serializer arranged between the switch and the display.

10. The rear view video system of claim 1, wherein the video modification module adds overlay information to the raw video signal when generating the modified video signal.

11. The rear view video system of claim 1, further comprising side and front view cameras, wherein the video modification module combines the raw video signal with images from the side and front view cameras when generating the modified video signal.

12. The rear view video system of claim 1, wherein the video analysis module determines that the modified video signal is invalid when the video modification module does not generate the modified video signal within a predetermined period after a reverse event occurs.

13. A video output system for a vehicle, comprising:
    a video modification module that receives a raw video signal from a first camera and that generates a modified video signal based thereon; and
    a video analysis module that analyzes whether the modified video signal is valid or invalid and that outputs the modified video signal when the modified video signal is valid and that outputs the raw video signal when the modified video signal is invalid.

14. The video output system of claim 13, wherein the video analysis module determines that the modified video signal is invalid when the modified video signal includes a frozen image.

15. The video output system of claim 14, wherein the video analysis module calculates a phase difference for images in the modified video signal to determine whether or not the modified video signal includes the frozen image.

16. The video output system of claim 13, wherein the video analysis module determines that the modified video signal is invalid when the modified video signal includes an all-white image or an all-black image.

17. The video output system of claim 16, wherein the video analysis module determines whether or not the modified video signal includes the all-white image or the all-black image based upon luma values.

18. The video output system of claim 13, further comprising a serializer arranged between the video analysis module and a display.

19. The video output system of claim 13, wherein the video modification module adds overlay information to the raw video signal when generating the modified video signal.

20. The video output system of claim 13, wherein the video modification module combines the raw video signal with images from a second camera when generating the modified video signal.

* * * * *